United States Patent
Hong et al.

(10) Patent No.: US 6,958,905 B2
(45) Date of Patent: Oct. 25, 2005

(54) MOBILE BODY-SUPPORTED COMPUTER WITH BATTERY

(75) Inventors: Peter S. Hong, Bristow, VA (US); Andrew Wong, Bethesda, MD (US)

(73) Assignee: Xybernaut Corporation, Fairfax, VA (US)

( * ) Notice: Subject to any disclaimer, the term of this patent is extended or adjusted under 35 U.S.C. 154(b) by 697 days.

(21) Appl. No.: 09/879,777

(22) Filed: Jun. 12, 2001

(65) Prior Publication Data

US 2002/0186177 A1 Dec. 12, 2002

(51) Int. Cl.⁷ ................................................. G06F 1/20
(52) U.S. Cl. ...................... 361/687; 345/169; 361/683; 361/689
(58) Field of Search ................................ 345/162, 168, 345/169; 361/683, 687, 689, 697

(56) References Cited

U.S. PATENT DOCUMENTS

| | | | |
|---|---|---|---|
| 5,285,398 A | | 2/1994 | Janik |
| 5,305,244 A | | 4/1994 | Newman et al. |
| 5,491,651 A | | 2/1996 | Janik |
| 5,710,931 A | | 1/1998 | Nakamura et al. |
| 5,719,744 A | * | 2/1998 | Jenkins et al. ............... 361/683 |
| 5,774,338 A | * | 6/1998 | Wessling, III ............... 361/730 |
| 5,844,824 A | | 12/1998 | Newman et al. |
| 6,262,889 B1 | * | 7/2001 | Newman et al. ............ 361/687 |
| 6,282,089 B1 | * | 8/2001 | Nakanishi et al. ........... 361/687 |
| 6,304,459 B1 | * | 10/2001 | Toyosato et al. ............ 361/681 |
| 6,356,437 B1 | * | 3/2002 | Mitchell et al. ............. 361/683 |
| 6,426,872 B1 | * | 7/2002 | Sutton et al. ................ 361/686 |
| 6,509,657 B1 | * | 1/2003 | Wong et al. ................... 307/66 |
| 6,522,531 B1 | * | 2/2003 | Quintana et al. ............ 361/683 |

* cited by examiner

*Primary Examiner*—Guy Lamarre
*Assistant Examiner*—Fritz Alphonse
(74) *Attorney, Agent, or Firm*—James J. Ralabate; Christopher M. Tucker

(57) ABSTRACT

The present application relates to a mobile computer and, more specifically, to a power management system for a user-supported computer that can be operated in a hands-free manner. Specifically, a mobile, body-supported computer comprising a computer housing, a heat insulating grille, an integral battery with a thermally non-conductive casing, activating means, means for attaching said computer housing to a user, said computer housing comprising substantially all of the components of a conventional computer. The thermally non-conducting battery casing and insulating grille provides a user a contact area that will not result in a burn injury.

17 Claims, 4 Drawing Sheets

MOBILE BODY-SUPPORTED COMPUTER WITH BATTERY

The present application relates to a mobile computer and, more specifically, to a novel user-supported computer with an integral battery that can be operated in a hands-free manner.

BACKGROUND OF THE INVENTION

It is known to use wearable or user-supported computers that can be operated in a hands-free manner; an example is the MOBILE ASSISTANT by Xybernaut Corporation. An important feature of these computers is that they permit the user to have freedom to use his or her hands for repairing or other manual functions while still able to use a fully functional computer. As above noted, one of the most well known of these user supported computers is the MOBILE ASSISTANT, computer line available from Xybernaut Corporation of Fairfax, Va. MOBILE ASSISTANT is a registered trademark of Xybernaut Corporation.

Xybernaut-owned U.S. Pat. No. 5,305,244 (Newman I) and U.S. Pat. No. 5,844,824 (Newman II) describe the details and components used in said user-supported computers. U.S. Pat. No. 5,844,824 (Newman II) describes and claims several hands-free activation means and other significant improvements or modifications in user supported computers. Both U.S. Newman I and Newman II are owned by the assignee of the present application and both describe in one embodiment where a rigid computer that has all components in a single housing. The disclosure of U.S. Pat. Nos. 5,305,244 and 5,844,824 are incorporated by reference in the present disclosure.

Other patents describing wearable computers are U.S. Pat. No. 5,285,398 (Janik I) and U.S. Pat. No. 5,491,651 (Janik II). Both of these patents disclose a non-rigid or a belt worn computer containing the elements or components of a computer in several different housings or pockets. In Janik I, the plurality of computing elements are located in separate pockets on the belt and a flexible signal relaying means connects all of the elements for computing. A protective covering is used for enclosing said computer elements. In Janik II, a similar belt computer is described and claimed in which the signal relaying means, the length of which between any two computing elements, is greater than the length of the wearable member between any two computing elements. In both Janik I and Janik II, the flexible wearable computer is in the form of a belt comprising around its periphery sequentially positioned computer elements.

In desktop and in many mobile computers, including laptops, the computer housings become extremely hot due to the heat generated by the CPU and other internal computer components. Of course, fans are used in larger computers but space precludes their use in wearables. Various means such as heat sinks and heat-insulating housings have been considered in wearables to minimize this heat problem but still potential problems exist.

Moreover, conventional computers, such as desktop or laptop computers, have not typically suffered from the problem of finding a reliable supply of power as do wearable computer. Conventional computers need only be plugged into an AC power outlet to provide a reliable supply of power since these computers rarely leave an office environment. Alternatively, they enter a suspension state when their batteries reach a predetermined voltage level as described in U.S. Pat. No. 5,710,931. A reliable power supply for a wearable computer has been difficult to maintain since these types of computers are supported on the user's body and are often used away from an AC power source and are limited by the lifetime of a charged battery. However, body-worn computers are often times being used away from the office were a convenient AC power supply is not available. For example, a worker out in the field such as up a telephone pole does not have the ability to supplement the power to his computer with AC power. Conventionally, a wearable computer (wearable(s)) user must carry additional batteries in the event the computer is needed longer than a typical battery lasts. Additionally, a user would have to power down his computer if he wished to replace the dead battery creating additional burden on the user.

Also in some wearables, a battery is worn apart from the computer housing. This requires connecting cables to electrically connect the housing to the battery. In wearables, cables are one of the most objectionable aspects since they sometimes get in the way of the user.

SUMMARY OF THE INVENTION

It is therefore an object of this invention to provide a computer structure devoid of the above-noted disadvantages.

A further object of this invention is to provide a novel battery for use in a body-supported computer to provide the user additional computing time.

Another object of this invention is to provide a novel computer structure having a battery integral to the structure.

Still a further object of this invention is to provide a computer structure having a battery that has a thermally non-conducting case to protect against heat generated and transferred to the outer surface of the structure closest to the user's body.

Yet a further object of this invention is to provide a computer with a spring loaded compartment for a battery to be inserted or attached to the computer housing and wherein there are no cables required for battery-computer connection.

Another object of this invention is to provide a computer structure that allows the batteries to be exchanged in a hot swappable manner.

Still a further object of this invention is to provide a mobile computer that optionally has communication means for communicating with other means using cell phones, hardwire phones, radio or infrared technology.

These and additional objects of the present invention are accomplished generally a mobile, body-supported computer comprising a computer housing, an integral battery with at least a portion constructed of a thermally non-conductive casing, activating means, means for attaching said computer housing to a user, said computer housing comprising substantially all of the components of a conventional computer.

In one embodiment of the present invention, the battery is built flush into the case of the wearable computer with a thermally non-conductive casing on an opposing face to the grille so that the user can pick up the device without the risk of a burn injury. While it is preferred that the battery casing be totally of a non-conductive material, it is critical that at least the portion of the casing nearest the user's body be heat non-conducting material. Additionally, the computer allows easy battery exchange by allowing the user to release the battery by sliding an actuating mechanism laterally, thus causing a spring loaded release mechanism to eject the battery.

In another embodiment of the present invention, the battery is hot swappable allowing the battery to the replaced without having to power down the computer. A capacitor is wired in parallel with the battery so that when the battery is removed the capacitor provides power to the CPU allowing the user to exchange batteries without losing data and shutting down the computer.

In another embodiment of the present invention, the computer uses a second battery supported by the user to facilitate hot swapping. A second battery supported by the user, typically worn around the user's waist, around user's torso, or wired into the pockets of the user's vest, is wired in parallel with the integral battery.

In another embodiment of the present invention, the computer is placed in a hibernate state where the CPU does not draw any current from the battery. The battery is able to be removed and replaced with a new battery without having to power down the computer.

The foregoing and additional objects and advantages of the invention together with the structure characteristics thereof which is only briefly summarized in the foregoing passages, becomes more apparent to those skilled in the art upon reading the detailed description and preferred embodiments, which follow in this specification, taken together with the illustration thereof presented in the representative accompanying drawings.

DETAILED DESCRIPTION OF THE DRAWINGS AND PREFERRED EMBODIMENTS

Figure 1:
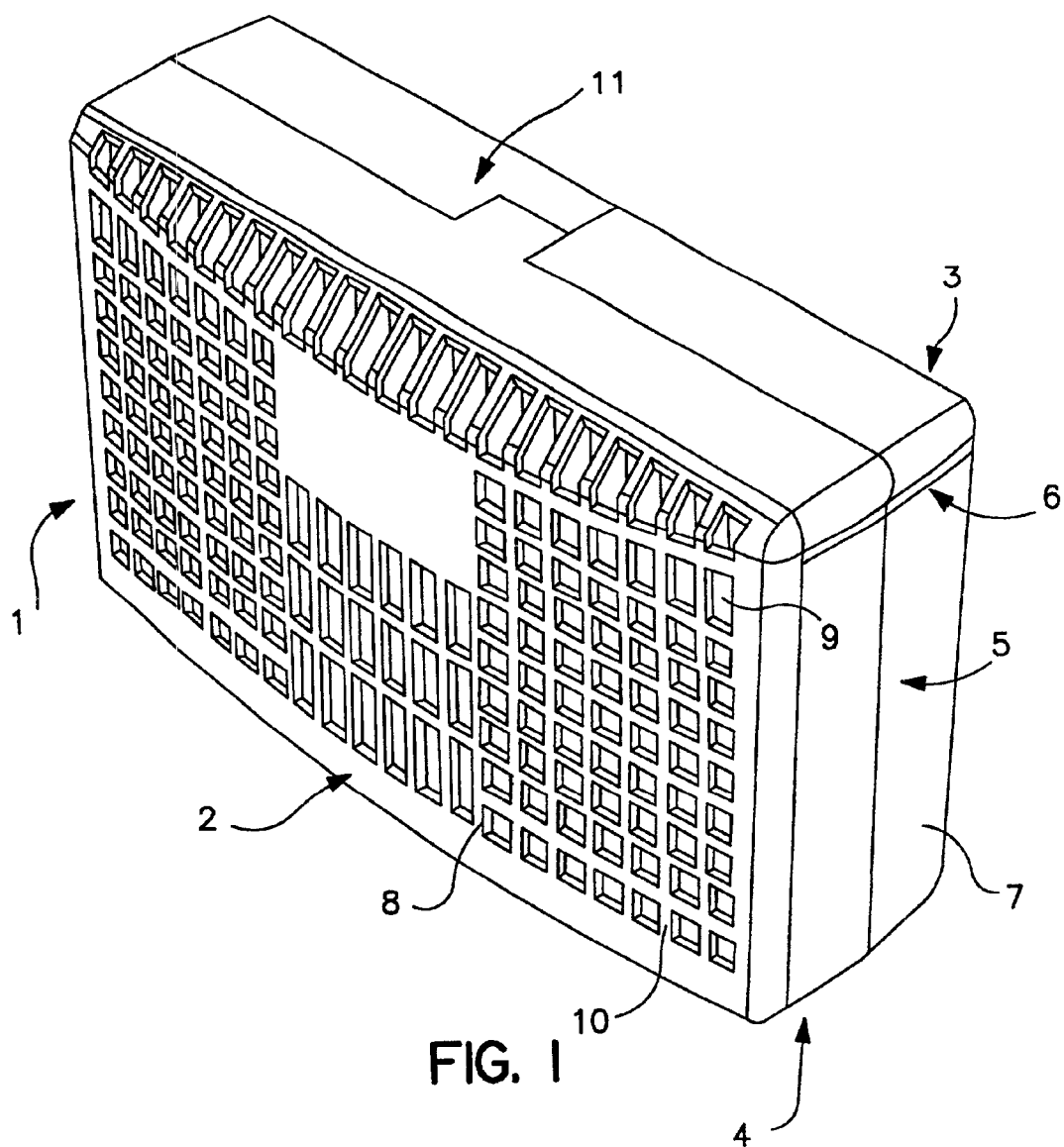
FIG. 1 is a perspective top view of a first embodiment of this invention having the integral battery on the back side of the computer housing.

Discussion of the invention will now be made with specific references to the drawing figures. In FIG. 1, a mobile user supported computer 1 is shown in a substantially rectangular form (any suitable form may be used) having a front portion 2, a bottom portion 3 (closest to the user's body), a back portion 4 and side portions 5. Heat sinks 6 may be used if desired on any portion of the housing 7 to assist in venting heat from the interior of housing 7. The heat insulating grille 8 is shown in this embodiment as covering just the front portion 2 of the housing 7; however, the grille 8 can be on at least one portion but can be on any or all exposed portions of housing 7. Grille 8 is constructed in this embodiment of a plurality of rectangular openings 9 that are configured to vent heat from the surface(s) of housing 7; this heat is generated within housing 7 by the CPU and other computer components. Cross bars 10 are made of any suitable substantially non-heat conducting material such as some plastics such as ABS resin, FRP resin, rubber, wood, silk, Styrofoam, fiberglass or any other suitable heat insulating material. The integral battery is shown as item number 11. The battery is encased at least partially in a similar thermally non-conductive material as is the cross bars 10.

Figure 2:
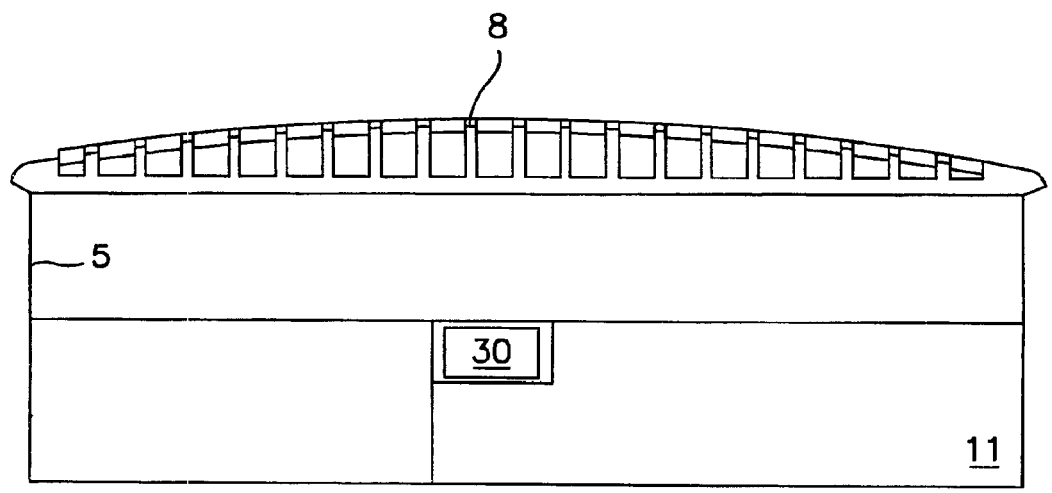
FIG. 2 is a top section top plan view of an embodiment of the computer of this invention.

FIG. 2 is a top section top plan view of an embodiment of the computer of this invention showing the integral battery 11.

Figure 3:
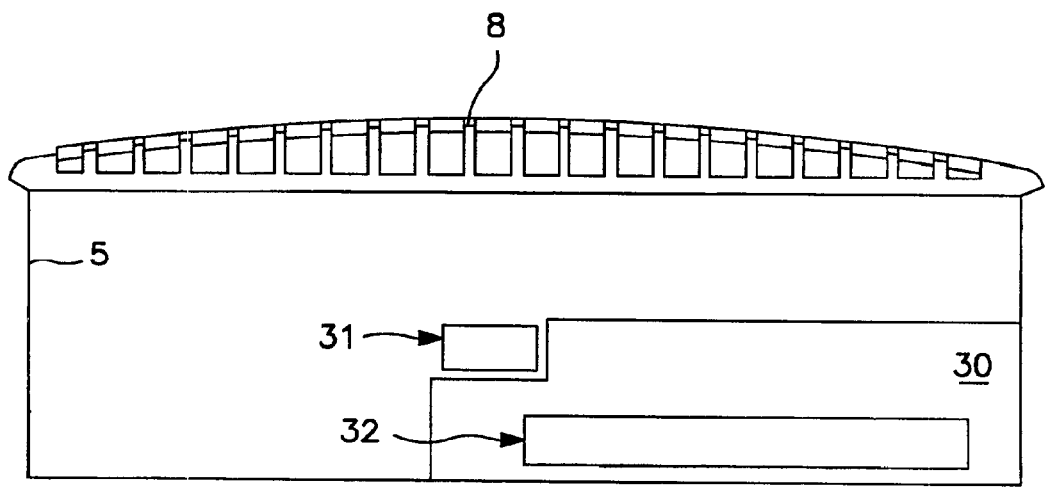
FIG. 3 is a top section top plan view of an embodiment of the computer of this invention without the battery in place showing the spring loaded locking mechanism, and battery compartment.

FIG. 3 is similar to FIG. 2, but without the battery showing the spring loaded locking mechanism and the battery compartment 30. The actuating mechanism 31 slides laterally which causes the release mechanism 32 to eject the battery 11.

Figure 4:
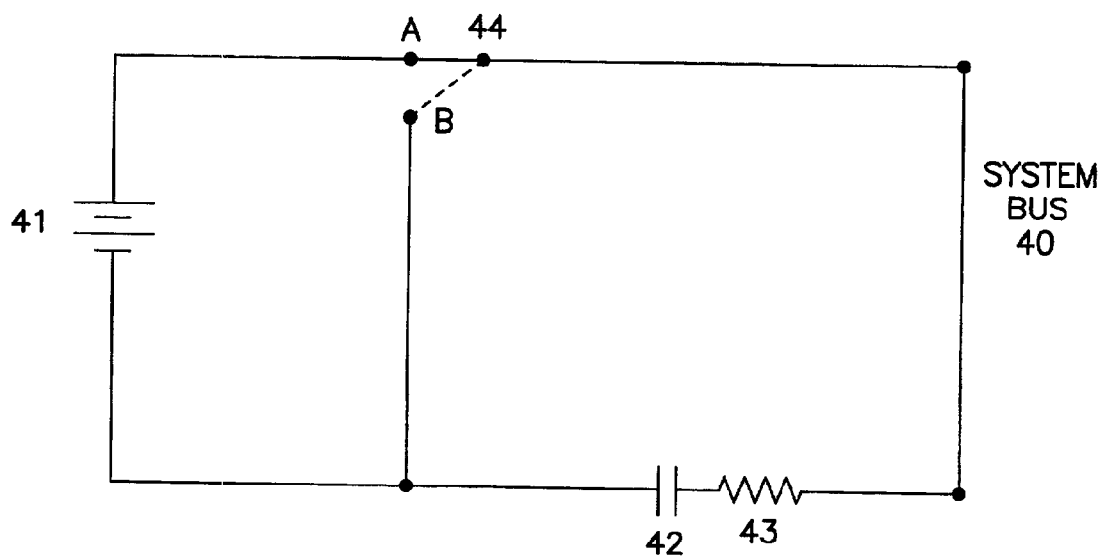
FIG. 4 shows a circuit diagram of the hot swappable feature of the present invention.

FIG. 4 shows a exemplary circuit diagram of the hot swappable feature of the present invention. The main system bus 40 is serially connected to the integral battery 41, a capacitor 42 and resistor 43 and a switch 44. When the switch is in the A position, the computer is powered by the battery and the capacitor is in a charging state. When the battery needs to be replaced, it is disconnected, thereby causing the switch to be in the B position. In this position, the capacitor is being discharged and powering the computer. When a new battery is inserted into the computer, the switch is flipped to position A and the capacitor recharges. The auxiliary power supplied by the capacitor can be optimized for the user's particular needs by adjusting the values of the resistor and capacitor.

Figure 5:
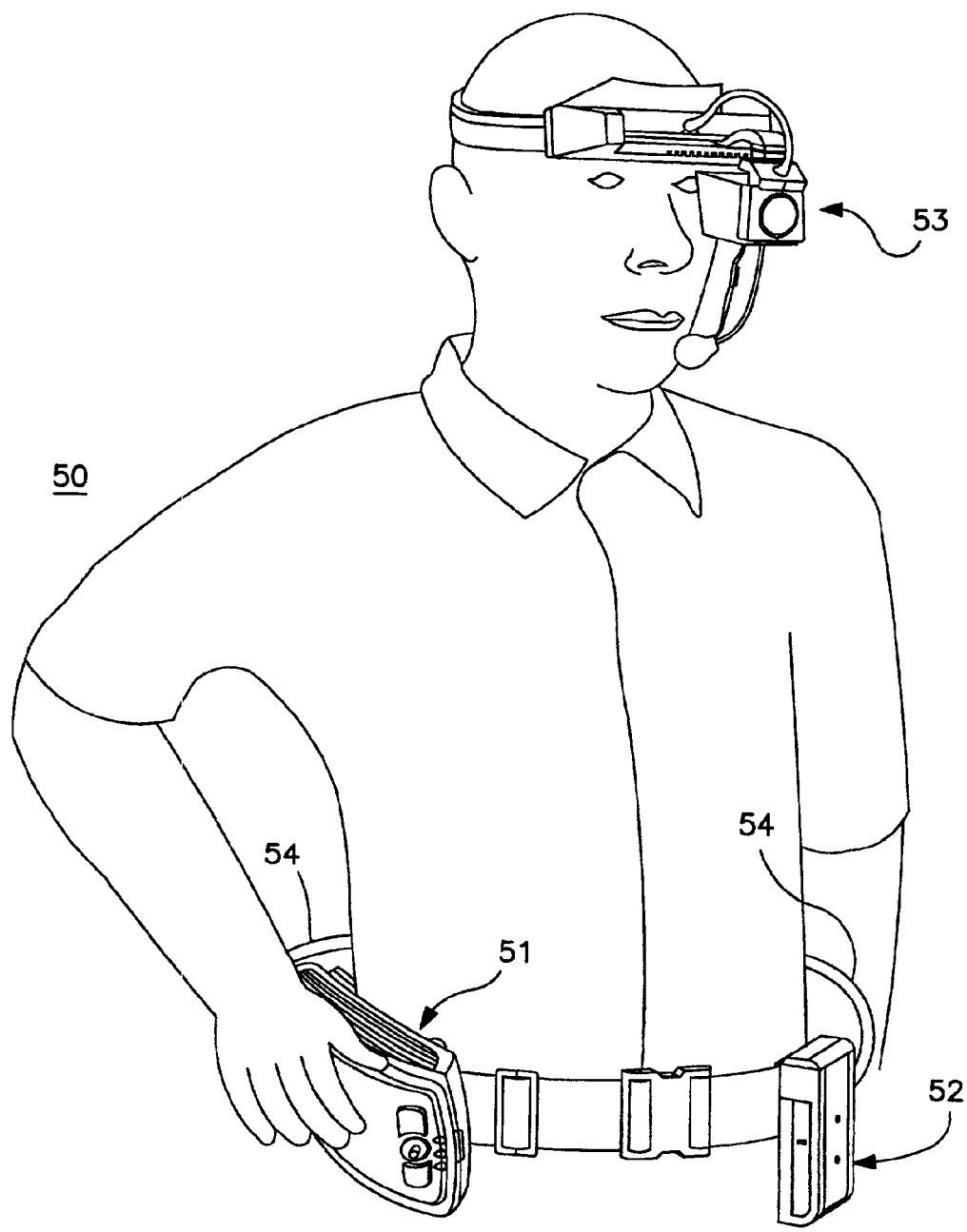
FIG. 5 is a front plan view of a user in a prior art system with a separated battery housing connected by cables to the process or housing.

FIG. 5 illustrates a conventional wearable computer system illustrated generally by reference number 50 where the computer 51 is used and worn around the waist of the user. Batteries 52 supply the computer and any peripherals, such as a head mounted display 53 with power through cables 54.

The present embodiments of this invention are thus to be considered in all respects as illustrative and not restrictive; the scope of the invention being indicated by the appended claims rather than by the foregoing description. All changes that come within the meaning and range of equivalency of the claims are intended to be embraced therein.

What is claimed is:

1. A mobile body supported computer comprising a computer housing, a heat insulating grille, an integral battery with casing said casing is at least partially constructed of a thermally non-conducting material, hands-free activation means, and means for supporting said computer housing by a user; said computer housing comprising substantially all of the components of a conventional computer, said housing having outside surfaces that when in use at least a portion are closest to the body of the user, said thermally non-conducting casing and insulating grille providing a user contact area on said mobile body supported computer that will not result in a burn injury.

2. The computer as in claim 1, wherein the integral battery is hot-swappable.

3. The computer of claim 1 wherein said housing comprises means in said computer housing for internal connection to a member selected from the group consisting of an IrDA transceiver, cell phones, radios and mixtures thereof.

4. The computer of claim 1 wherein an outer section of said housing comprises means for connection to mouse control means.

5. The computer of claim 1 wherein said computer has connecting means to a power supply, a keyboard or a monitor.

6. The computer of claim 1 wherein said hands-free activation means is selected from the group consisting of audio activation means, eye-tracking activation means, electroencephalography activation means, head and arm-tracking means and mixtures thereof.

7. A mobile body supported computer comprising a computer housing, an integral battery with casing said casing is at least partially constructed of a thermally non-conducting material, hands-free activation means, and means for supporting said computer housing by a user; said computer housing comprising substantially all of the components of a conventional computer, said housing having outside surfaces that when in use at least a portion are closest to the body of the user, said thermally non-conducting casing providing a user contact area on said mobile body supported computer that will not result in a burn injury.

8. The computer as in claim 7, wherein the integral battery is hot-swappable.

9. The computer of claim 7 wherein said housing comprises means in said computer housing for internal connection to a member selected from the group consisting of an IrDA transceiver, cell phones, radios and mixtures thereof.

10. The computer of claim 7 wherein an outer section of said housing comprises means for connection to mouse control means.

11. The computer of claim 7 wherein said computer has connecting means to a power supply, a keyboard or a monitor.

12. A mobile body supported computer comprising:
   a computer housing, the computer housing including substantially all of components of a conventional computer, having a first surface near a user's body, and a second surface located opposite to the first surface;
   a heat insulating grille positioned on the second surface;
   an integral battery with casing, the casing being partially constructed of a thermally non-conducting material;
   means for activating the computer hands-free; and
   means for supporting the computer housing by a user.

13. A mobile body supported computer comprising:
   a computer housing, the computer housing including substantially all of components of a conventional computer, having a first surface near a user's body, and a second surface located opposite to the first surface;
   a heat insulating grille;
   an integral battery positioned on at least a portion of the first surface and contained within a casing, the casing being partially constructed of a thermally non-conducting material;
   means for activating the computer hands-free; and
   means for supporting the computer housing by a user.

14. A mobile body supported computer comprising:
   a computer housing, the computer housing including substantially all of components of a conventional computer, having a first surface near a user's body, and a second surface located opposite to the first surface;
   a heat insulating member positioned on at least one of the first surface or the second surface;
   an integral battery with casing, the casing being partially constructed of a thermally non-conducting material;
   means for activating the computer hands-free; and
   means for supporting the computer housing by a user.

15. A mobile body supported computer comprising:
   a computer housing, the computer housing including substantially all of components of a conventional computer, having a first surface near a user's body, and a second surface located opposite to the first surface;
   means for inhibiting heat conduction positioned on at least one of the first surface or the second surface;
   an integral battery with casing, the casing being partially constructed of a thermally non-conducting material;
   means for activating the computer hands-free; and
   means for supporting the computer housing by a user.

16. A mobile body supported computer, comprising:
   a computer housing;
   a heat insulating grille located on at least a portion of the computer housing;
   an integral battery with casing, the casing being at least partially constructed of a thermally non-conducting material;
   means for activating the computer hands-free; and
   means for supporting the computer housing by a user;
   wherein the computer housing includes substantially all of the components of a conventional computer and the thermally non-conducting casing or the heat insulating grille providing a user contact area on the computer that will not result in a burn injury.

17. The computer of claim 1 or 16, wherein the heat insulating grille is located on all exposed portions of the housing.

* * * * *